United States Patent
Ricciardi et al.

(10) Patent No.: US 8,274,965 B2
(45) Date of Patent: Sep. 25, 2012

(54) METHOD AND APPARATUS FOR PROVIDING A NETWORK BASED CALL PROCESSING MANAGER

(75) Inventors: Dominic Ricciardi, Bridgewater, NJ (US); Silvano Brewster, Aberdeen, NJ (US); James Ibezim, Wayside, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 855 days.

(21) Appl. No.: 12/189,528

(22) Filed: Aug. 11, 2008

(65) Prior Publication Data

US 2010/0034371 A1 Feb. 11, 2010

(51) Int. Cl.
*H04L 12/66* (2006.01)
*H04M 3/00* (2006.01)
(52) U.S. Cl. ............... 370/352; 379/265.09; 379/265.11
(58) Field of Classification Search ............. 379/265.01, 379/265.02, 265.09, 265.11–265.13; 370/352; 709/228
See application file for complete search history.

(56) References Cited

U.S. PATENT DOCUMENTS

| | | | |
|---|---|---|---|
| 6,614,902 B1 * | 9/2003 | Rizzetto | 379/265.11 |
| 6,791,971 B1 * | 9/2004 | Osman et al. | 370/352 |
| 7,110,525 B1 * | 9/2006 | Heller et al. | 379/265.11 |
| 7,848,312 B2 * | 12/2010 | Zhang et al. | 370/352 |
| 2003/0108183 A1 * | 6/2003 | Dhir et al. | 379/265.01 |
| 2005/0195962 A1 * | 9/2005 | Brown | 379/265.02 |
| 2011/0040884 A1 * | 2/2011 | Khadri et al. | 709/228 |

* cited by examiner

*Primary Examiner* — Yuwen Pan
*Assistant Examiner* — Sonia Gay

(57) ABSTRACT

A method and apparatus for providing a network based call processing manager are disclosed. For example, the method receives a call by a call processing manager deployed in a communication network, wherein the call is for a customer that subscribes to a network based call processing service. The method obtains one or more routing instructions for handling the call from an automatic call distribution system, wherein the automatic call distribution system is deployed external to the communication network. The method then forwards the one or more routing instructions to an application server that routes the call in accordance with the one or more routing instructions.

20 Claims, 4 Drawing Sheets

METHOD AND APPARATUS FOR PROVIDING A NETWORK BASED CALL PROCESSING MANAGER

The present invention relates generally to communication networks and, more particularly, to a method and apparatus for providing a network based call processing manager in a network, e.g., Internet Protocol (IP) network, Voice over Internet Protocol (VoIP) network, etc.

BACKGROUND OF THE INVENTION

An enterprise customer may subscribe to a Wide Area Telecommunications Service (WATS), e.g., a toll-free service. When a calling party calls the toll-free number, a toll-free application server determines the appropriate service logic and routes the call towards an automatic call distribution system located at the customer premise. The automatic call distribution system routes the call towards an agent. However, this approach requires each enterprise customer to implement the call management functionality at the enterprise site. For example, the call managing device at the enterprise site may route the incoming calls to various agents via a Virtual Private Network (VPN) interconnecting the enterprise customer's Local Area Networks (LANs). Hence, the enterprise customer has to dedicate resources for one or more VPNs, LANs, etc. to enable the call management functionality. Since the resources are all enterprise based, the customer is unable to share the cost of the call management platform with other enterprises. Furthermore, the enterprise customer is unable to scale up/down the number of calls that may be routed for specific durations.

SUMMARY OF THE INVENTION

In one embodiment, the present invention discloses a method and apparatus for providing a network based call processing manager. For example, the method receives a call by a call processing manager deployed in a communication network, wherein the call is for a customer that subscribes to a network based call processing service. The method obtains one or more routing instructions for handling the call from an automatic call distribution system, wherein the automatic call distribution system is deployed external to the communication network. The method then forwards the one or more routing instructions to an application server that routes the call in accordance with the one or more routing instructions.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing a network based call processing manager on a packet network, e.g., an Internet Protocol (IP) network.

Figure 1:
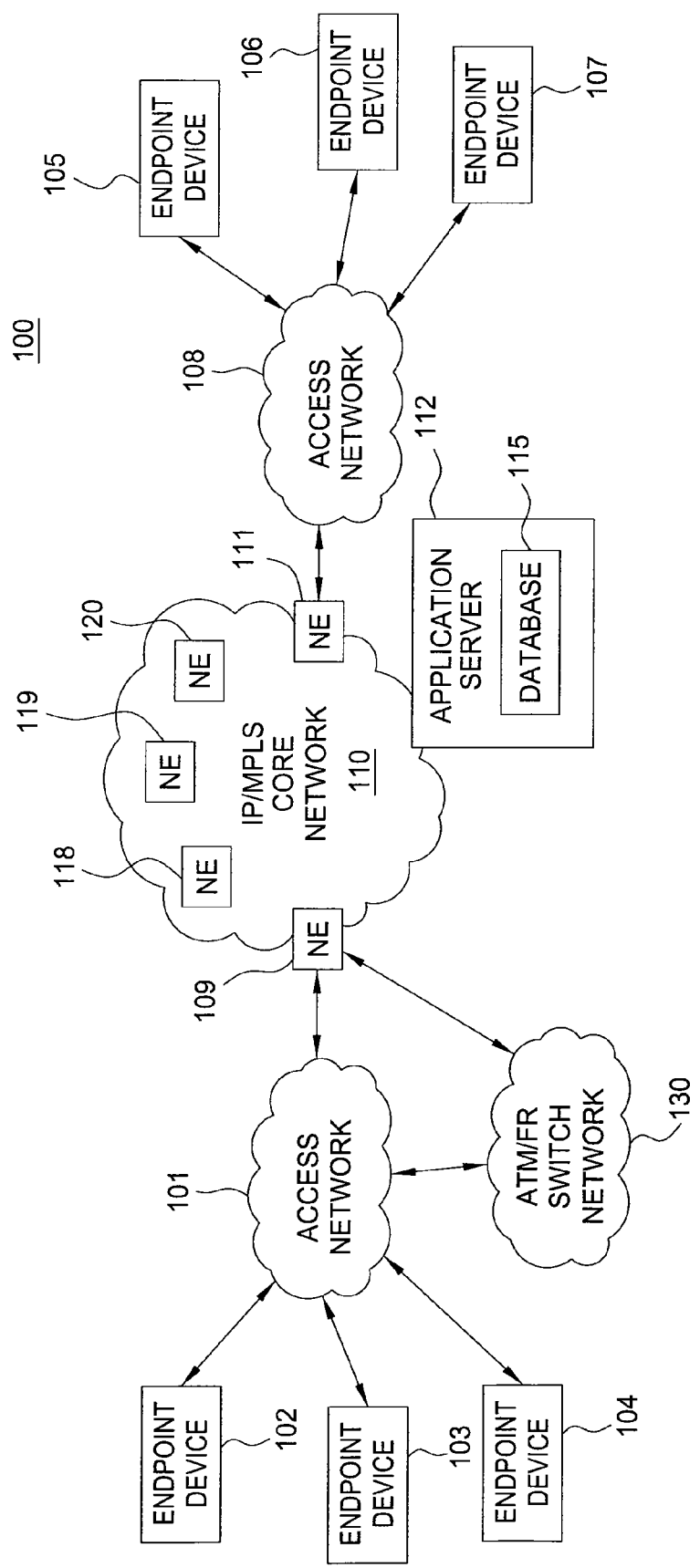
FIG. 1 illustrates an exemplary network related to the present invention.

FIG. 1 is a block diagram depicting an exemplary network 100 related to the current invention. Exemplary networks include Internet protocol (IP) networks, Asynchronous Transfer Mode (ATM) networks, frame-relay networks, and the like. ATM, frame-relay and IP networks are packet based networks. An IP network is broadly defined as a network that uses Internet Protocol such as IPv4 or IPv6 and the like to exchange data packets.

In one embodiment, the network 100 may comprise a plurality of endpoint devices 102-104 configured for communication with the core packet network 110 (e.g., an IP based core backbone network supported by a service provider). The endpoint devices 102-104 may communicate with the IP/MPLS core network 110 via an access network 101. Similarly, a plurality of endpoint devices 105-107 are configured for communication with the core packet network 110 via an access network 108. The network elements 109 and 111 may serve as gateway servers or edge routers for the IP/MPLS core network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111. The access networks 101 and 108 may each comprise a Digital Subscriber Line (DSL) network, a broadband cable access network, a Local Area Network (LAN), a Wireless Access Network (WAN), a $3^{rd}$ party network, and the like.

The access networks 101 and 108 may be either directly connected to NEs 109 and 111 of the IP/MPLS core network 110 or through an Asynchronous Transfer Mode (ATM) and/or Frame Relay (FR) switch network 130. If the connection to the IP/MPLS core network 110 is through the ATM/FR network 130, the packets from customer endpoint devices 102-104 (traveling towards the IP/MPLS core network 110) traverse the access network 101 and the ATM/FR switch network 130 and reach the border element 109.

The ATM/FR network 130 contains Layer 2 switches functioning as Provider Edge Routers (PER) and/or Provider Routers (PR). The PERs may also contain an additional Route Processing Module (RPM) that converts Layer 2 frames to Layer 3 Internet Protocol (IP) frames. An RPM enables the transfer of packets from a Layer 2 Permanent Virtual Connection (PVC) circuit to an IP network which is connectionless.

Some NEs (e.g., NEs 109 and 111) reside at the edge of the IP/MPLS core infrastructure and interface with customer endpoints over various types of access networks. An NE that resides at the edge of a core infrastructure is typically implemented as an edge router, a media gateway, a border element, a firewall, a switch, and the like. An NE may also reside within the IP network (e.g., NEs 118-120) and may be used as a mail server, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements, one application server are depicted in FIG. 1, the communication system 100 may be expanded by including any number of endpoint devices, access networks, network elements, application servers, 3$^{rd}$ party networks, etc. without altering the scope of the present invention.

The above IP network is described to provide an illustrative environment in which packets for voice and data services are transmitted on networks. For example, an enterprise customer may subscribe to a Wide Area Telecommunications Service (WATS), e.g., a toll-free service from an IP/MPLS service provider.

The service provider may implement the toll-free service in an IP toll-free application server, e.g., 112, located in the IP/MPLS network. When a Call Control Element (CCE) (e.g., a network element) for the IP/MPLS network receives a toll-free call for the enterprise customer, the CCE sends the call to the IP toll-free application server. The IP toll-free application server determines the appropriate service logic and routes the call towards the customer location.

A call manager at the customer location then receives call routing instructions from an Automatic Call Distribution (ACD) system, e.g., located at the customer premise. For example, the ACD may send a 3XX Session Initiation Protocol (SIP) message to the call manager. The 3XX message provides instructions for redirecting the call. The call manager then sends the call via the customer VPN to the selected agent. The above approach requires the enterprise customer to implement the call manager at the enterprise site. Hence, the enterprise customer has to provide resources for one or more VPNs, LANs, etc. to enable the call manager to route the incoming calls towards the appropriate agents. In this example, the call manager, VPN, LAN, etc. are all dedicated to the single enterprise customer.

Figure 2:
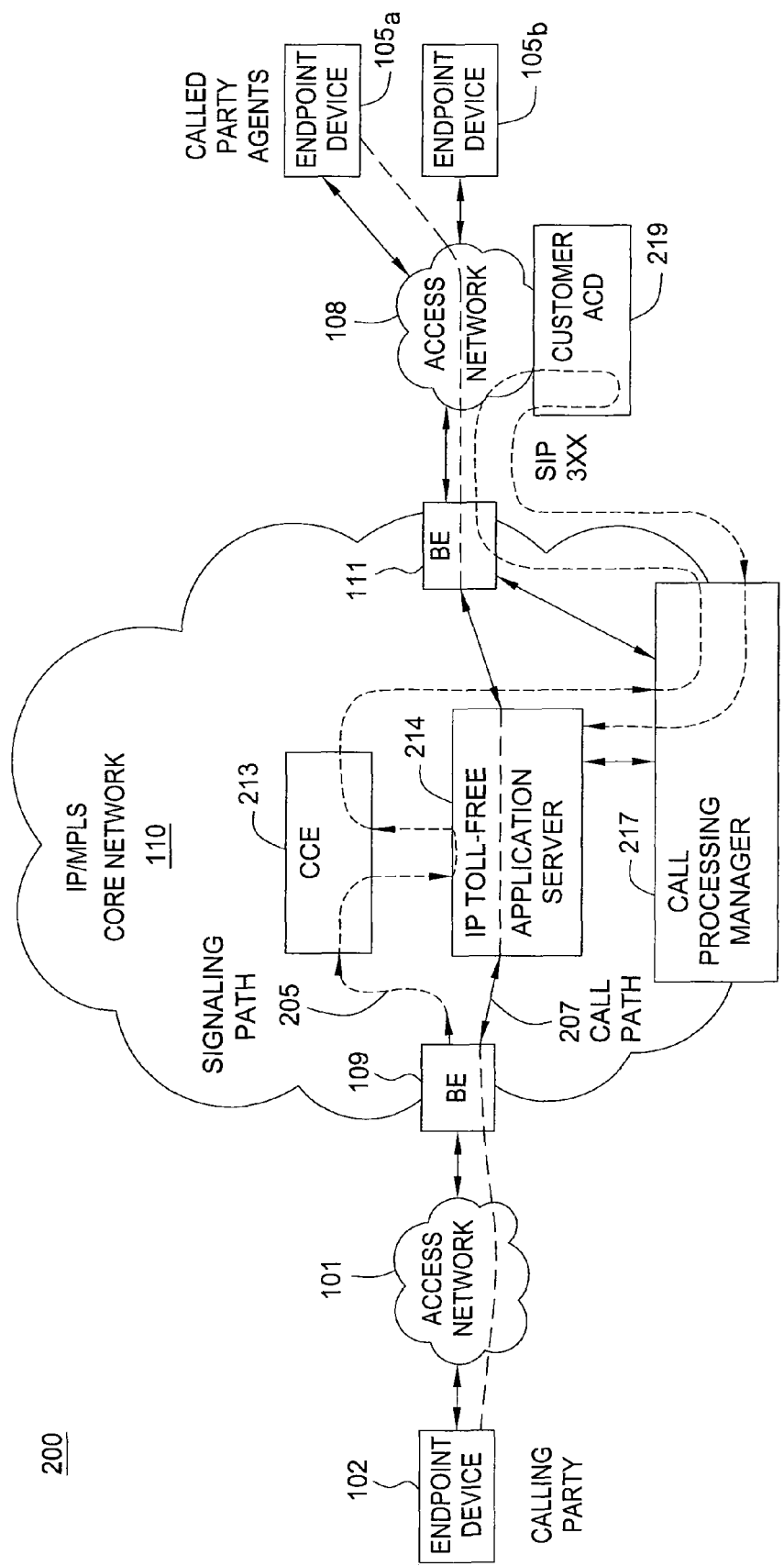
FIG. 2 illustrates an exemplary network for providing a network based call processing manager.

In one embodiment of the present invention, the present invention discloses a method and apparatus for providing a network based call processing manager. FIG. 2 illustrates an exemplary network 200 for providing a network based call processing manager. For example, a customer endpoint device 102 is communicating with an IP/MPLS core network 110 via an access network 101. An enterprise customer has agents receiving incoming calls via a customer endpoint device 105a or 105b. The customer endpoint devices 105a and 105b are communicating with the IP/MPLS core network 110 via the access network 108.

In one embodiment, the IP/MPLS core network 110 comprises a Call Control Element 213, an IP toll-free application server 214, border elements 109 and 111, and a call processing manager 217. Border elements 109 and 111 function as PE routers for the IP/MPLS core network 110. The CCE 213 receives calls from the border elements, determines one or more features and application servers for handling the received calls, and then forwards the calls to the identified application servers. For example, the IP toll-free application server 214 provides the appropriate service logic for toll-free calls and forwards the calls accordingly.

In one embodiment, an enterprise customer subscribes to a network based call processing from the IP/MPLS core network 110, where the network employs a call processing manager 217. In turn, the enterprise customer employs a customer ACD 219 (e.g., external to the network 110) that provides real time call routing instructions to the call processing manager 217 that is located in the IP/MPLS network 110.

To illustrate, a calling party 102 may initiate a toll-free call towards the enterprise customer with agents 105a and 105b. The call traverses the access network 101 towards the BE 109, where BE 109 forwards the call towards CCE 213. The CCE 213 then determines that the call subscribes to a terminating feature (toll-free) and forwards the call to the IP toll-free application server 214. The application server 214 then determines that the call is for an enterprise customer that subscribes to a network based call processing. The application server then forwards the call to the network based call processing manager 217. The call processing manager 217, as part of the call setup, obtains real time call routing instructions from the customer ACD 219, prior to routing the call. For example, the call processing manager 217 may receive a SIP 3XX message from the customer ACD 219 containing instructions for redirecting the call to a specific agent. The call processing manager 217 then forwards the received routing instructions to the application server 214 for service processing. The application server 214 may then forward the network routing instructions to the IP router, e.g., an IP PBX. Note that, the call processing manager 217 is in the signaling path 205 but not in the call path or media path 207.

Figure 3:
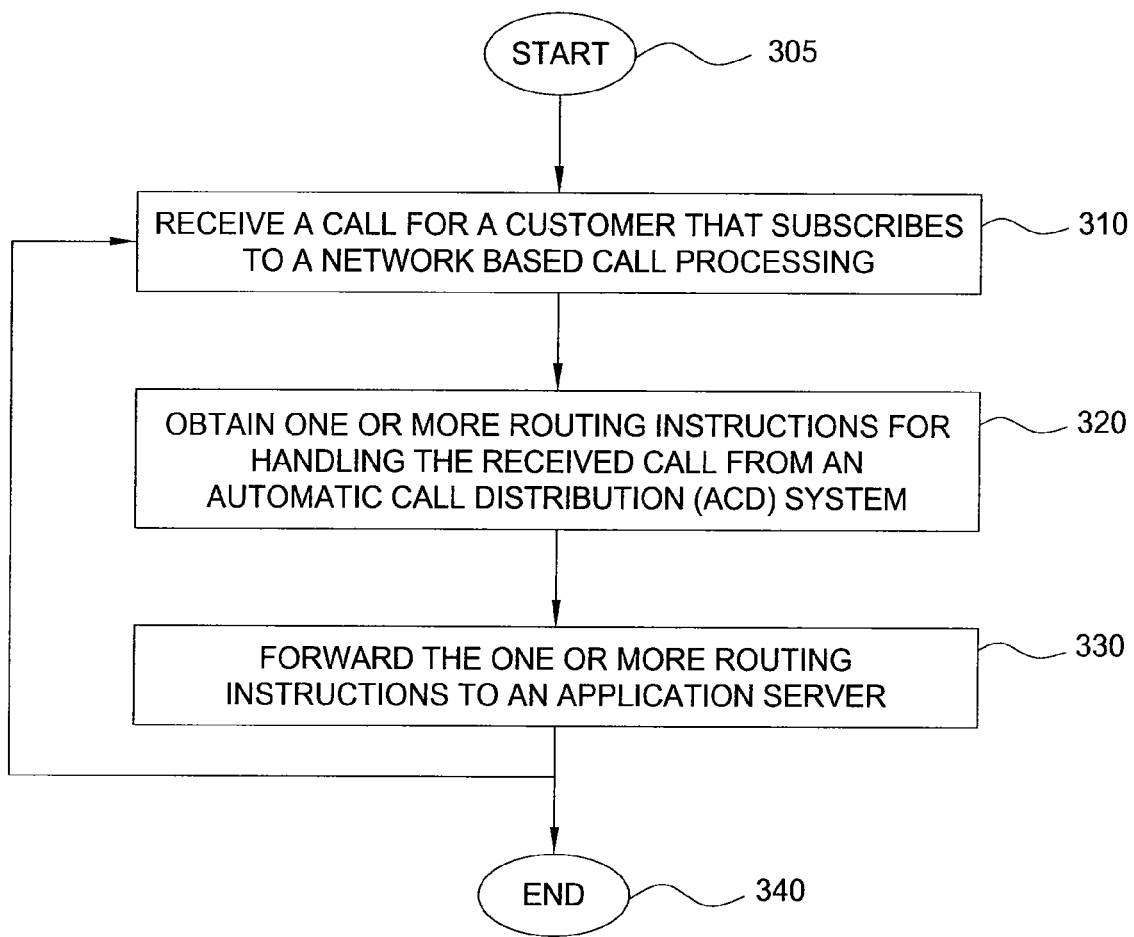
FIG. 3 illustrates a flowchart of a method for providing a network based call processing manager.

FIG. 3 illustrates a flowchart of a method 300 for providing a network based call processing manager. For example, one or more steps of method 300 can be implemented by the network based call processing manager 217. Method 300 starts in step 305 and proceeds to step 310.

In step 310, method 300 receives a call for a customer that subscribes to a network based call processing service. For example, a call processing manager receives a toll-free call directed towards a subscriber of a network based call processing service. For example, the network service provider may be responsible for distributing incoming toll-free calls towards various agents of the enterprise customer.

In step 320, method 300 obtains one or more routing instructions for handling the received call from an Automatic Call Distribution (ACD) system. For example, upon receiving a call from an IP toll-free application server, the call processing manager may query the customer ACD system for routing instructions, prior to routing the incoming toll-free call.

In one embodiment, the one or more routing instructions may be provided to the network service provider on a call by call basis. In an alternate embodiment, the routing instructions may be provided in a predetermined schedule, e.g., uploaded to the call processing manager in accordance with a predetermined schedule, e.g., every 30 minutes, every hour, every day, and so on.

In one embodiment, the one or more routing instructions may be implemented via standard based messages, e.g., Hypertext Transfer Protocol (HTTP) messages, SIP 3XX redirecting messages, etc. In another embodiment, the one or more routing instructions may be implemented via customized messages customized for each enterprise customer.

In step 330, method 300 forwards the one or more routing instructions to an application server. For example, the call processing manager 217 may forward the routing instructions to the IP toll-free application server 214 to complete the handling of the call request. The IP toll-free application server may then use the received one or more routing instructions for routing the call towards its destination. That is, the service processing may be performed such that the call is forwarded to a particular agent among a plurality of available agents for the called party, in accordance with the instructions received from the customer ACD through the call processing manager. The method may proceed back to step 310 to continue receiving additional call requests, or it may end in step 340.

In one embodiment, the call processing manager processes incoming calls on a first come- first served basis. For example, the call processing manager may handle calls in the order they are received by forwarding the calls to the first agent available to answer the call. In another embodiment, the call processing manager processes incoming calls based on one or more criteria such as time of day, caller identification (e.g., caller's phone number, name), etc, for routing the calls to specific agents. For example, calls received during normal business hours are routed to one group of agents, whereas calls received outside of normal business hours are routed to another group of agents. In another example, calls from important customers (e.g., customers who are high volume purchasers and the like) are routed to one group of agents, whereas regular customers are routed to another group of agents and so on.

In one embodiment, the call processing manager processes incoming calls based on caller responses gathered via either an IVR (Interactive Voice Response) interface or keypad entry in response to query announcements. For example, the call processing manager may query the calling party and ask the calling party to provide responses via either an IVR system or keypad entry. For example, a query might announce "if you are a current customer press or say one, if you are a new customer press or say two." The caller's input may then be used to select the agent who will be answering the call. For example, if the caller is an existing customer and is able to provide a customer ID, a specific agent for that customer may be selected.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
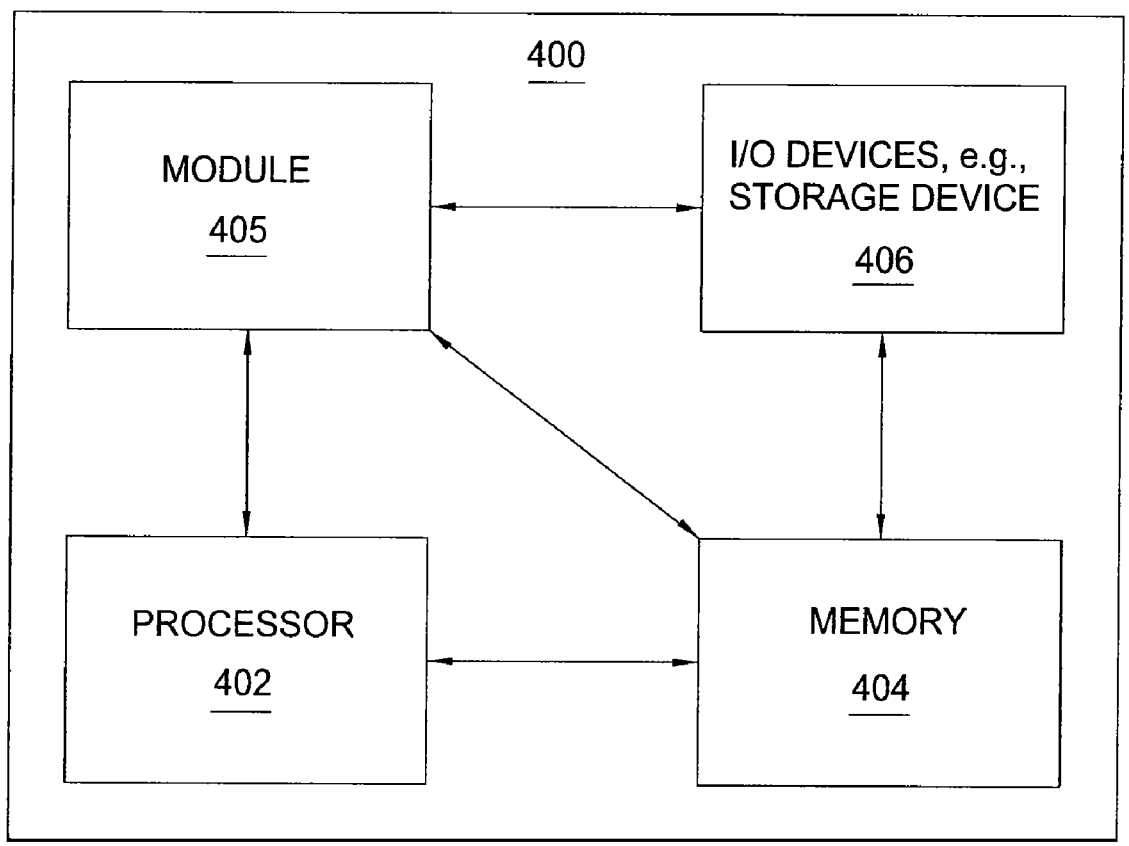
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing a network based call processing manager, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing a network based call processing manager can be loaded into memory 404 and executed by processor 402 to implement the functions as discussed above. As such, the present method 405 for providing a network based call processing manager (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a network based call processing manager comprising:
   receiving a call by a call processing manager deployed in a communication network, wherein the call is for a customer that subscribes to a network based call processing service, wherein the call is received from an internet protocol toll-free application server in the communication network;
   obtaining a routing instruction for handling the call from an automatic call distribution system, wherein the automatic call distribution system is deployed external to the communication network; and
   forwarding the routing instruction to the internet protocol toll-free application server that routes the call in accordance with the routing instruction.

2. The method of claim 1, wherein the routing instruction is provided on a call by call basis.

3. The method of claim 1, wherein the routing instruction is implemented via a standard based message.

4. The method of claim 3, wherein the standard based message comprises a hypertext transfer protocol message.

5. The method of claim 1, wherein the call comprises a toll-free call.

6. The method of claim 1, wherein the call is forwarded to an agent of the customer on a first come-first served basis.

7. The method of claim 1, wherein the call is forwarded to an agent based on a criterion, wherein the criterion comprises a caller identification.

8. The method of claim 1, wherein the call is forwarded to an agent based on a caller response to a query announcement.

9. The method of claim 8, wherein the caller response is gathered via an interactive voice response interface.

10. A non-transitory computer-readable medium having stored thereon a plurality of instructions, the plurality of instructions including instructions which, when executed by a processor, cause the processor to perform a method for providing a network based call processing manager, comprising:
    receiving a call by a call processing manager deployed in a communication network, wherein the call is for a customer that subscribes to a network based call processing service, wherein the call is received from an internet protocol toll-free application server in the communication network;
    obtaining a routing instruction for handling the call from an automatic call distribution system, wherein the automatic call distribution system is deployed external to the communication network; and
    forwarding the routing instruction to the internet protocol toll-free application server that routes the call in accordance with the routing instruction.

11. The non-transitory computer-readable medium of claim 10, wherein the routing instruction is provided on a call by call basis.

12. The non-transitory computer-readable medium of claim 10, wherein the routing instruction is implemented via a standard based message.

13. The non-transitory computer-readable medium of claim 12, wherein the standard based message comprises a hypertext transfer protocol message.

14. The non-transitory computer-readable medium of claim 10, wherein the call comprises a toll-free call.

15. The non-transitory computer-readable medium of claim 10, wherein the call is forwarded to an agent of the customer on a first come-first served basis.

16. The non-transitory computer-readable medium of claim 10, wherein the call is forwarded to an agent based on a criterion, wherein the criterion comprises a caller identification.

17. The non-transitory computer-readable medium of claim 10, wherein the call is forwarded to an agent based on a caller response to a query announcement.

18. The non-transitory computer-readable medium of claim 17, wherein the caller response is gathered via an interactive voice response interface.

19. An apparatus for providing a network based call processing manager comprising:
- a processor deployed in a communication network; and
- a computer-readable medium in communication with the processor, the computer-readable medium having stored thereon a plurality of instructions, the plurality of instructions including instructions which, when executed by the processor, cause the processor to perform a method, comprising:
  - receiving a call, wherein the call is for a customer that subscribes to a network based call processing service, wherein the call is received from an internet protocol toll-free application server in the communication network;
  - obtaining a routing instruction for handling the call from an automatic call distribution system, wherein the automatic call distribution system is deployed external to the communication network; and
  - forwarding the routing instruction to the internet protocol toll-free application server that routes the call in accordance with the routing instruction.

20. The apparatus of claim 19, wherein the routing instruction is provided on a call by call basis.

* * * * *